United States Patent
Ta et al.

(10) Patent No.: US 10,536,054 B2
(45) Date of Patent: Jan. 14, 2020

(54) MOUNTING STRUCTURE AND GEAR MOTOR COMPRISING SAME

(71) Applicant: JOHNSON ELECTRIC INTERNATIONAL AG, Murten (CH)

(72) Inventors: Jing Ning Ta, Hong Kong (CN); Wei Xing Mao, Shenzhen (CN); Qiu Mei Li, Shenzhen (CN); Zhi Qiang Wu, Shenzhen (CN); Lan Gui Xing, Shenzhen (CN)

(73) Assignee: Johnson Electric International AG, Murten (CH)

( * ) Notice: Subject to any disclaimer, the term of this patent is extended or adjusted under 35 U.S.C. 154(b) by 207 days.

(21) Appl. No.: 15/612,363

(22) Filed: Jun. 2, 2017

(65) Prior Publication Data
US 2017/0366066 A1  Dec. 21, 2017

(30) Foreign Application Priority Data

Jun. 17, 2016 (CN) ......................... 2016 1 0437931

(51) Int. Cl.
| | |
|---|---|
| H02K 7/116 | (2006.01) |
| F16H 57/023 | (2012.01) |
| B23P 11/02 | (2006.01) |
| F16B 4/00 | (2006.01) |
| F16H 1/46 | (2006.01) |
| F16H 57/02 | (2012.01) |

(52) U.S. Cl.
CPC .............. *H02K 7/116* (2013.01); *B23P 11/02* (2013.01); *F16B 4/004* (2013.01); *F16H 1/46* (2013.01); *F16H 57/02* (2013.01); *F16H 57/023* (2013.01); *F16H 2057/02034* (2013.01)

(58) Field of Classification Search
CPC . H02K 7/116; H02K 5/15; H02K 5/00; F16H 57/02; F16H 57/023; F16H 2057/02034; F16B 4/004; B23P 11/02; B23P 15/14; Y10T 29/49464; Y10T 29/49465; Y10T 29/49954
See application file for complete search history.

(56) References Cited

U.S. PATENT DOCUMENTS

| | | | | |
|---|---|---|---|---|
| 4,146,953 | A * | 4/1979 | King, Jr. ................. | B21J 15/022 29/453 |
| 7,866,433 | B2 * | 1/2011 | Martin, III ............... | B60G 3/20 180/337 |
| 9,115,790 | B2 * | 8/2015 | Zhu ........................ | A63B 55/61 |
| 9,331,549 | B2 * | 5/2016 | Knappenberger ....... | H02K 5/04 |
| 2016/0123444 | A1 * | 5/2016 | Riedinger ............... | F16H 25/20 74/424.71 |

* cited by examiner

*Primary Examiner* — Erin D Bishop
(74) *Attorney, Agent, or Firm* — Muncy, Geissler, Olds & Lowe, P.C.

(57) ABSTRACT

A mounting structure includes at least one first hole formed in a first component of the gear motor, at least one second hole formed in a second component of the gear motor, arranged coaxially with the first hole, and at least one expansion member extending into the first and second holes. The expansion member has an interference fit with one of the first and second holes, and has a transition fit with the other of the first and second holes. The present invention can effectively prevent falling off of the expansion member, and reduce the assembly difficulties of the gear motor as well as the degree of deformation of the expansion member during the assembly process.

17 Claims, 6 Drawing Sheets

MOUNTING STRUCTURE AND GEAR MOTOR COMPRISING SAME

CROSS REFERENCE TO RELATED APPLICATIONS

This non-provisional patent application claims priority under 35 U.S.C. § 119(a) from Patent Application No. 201610437931.7 filed in The People's Republic of China on Jun. 17, 2016.

FIELD OF THE INVENTION

The present invention relates to gear motors, and in particular to a gear motor and a mounting structure of the gear motor.

BACKGROUND OF THE INVENTION

In a gear motor, a gearbox is assembled with a motor, and the output speed and output torque of the motor are changed by a speed change gear mechanism to accommodate a load. For example, an open-close mechanism for a rear door of a vehicle utilizes a planetary gear motor to reduce the rotation speed and increase the torque of the motor to successfully open or close the rear door.

Currently, the speed change gearbox is usually mounted to the motor through a mounting plate. The mounting plate is mounted on an outer housing of the motor, and various components of the speed change gearbox are then mounted to the mounting plate through a mounting structure in the form of a hole-pin engagement. However, the engagement holes in the existing designs have the same size, which can easily cause the following issues: if engagement holes are not coaxially arranged and are slightly misaligned, the pin cannot be easily inserted into the holes during assembly, which may also cause the pin to deform; in addition, due to the misalignment, the pin can easily fall off the hole during use of the gear motor.

SUMMARY OF THE INVENTION

In one aspect, a mounting structure for use in a gear motor is provided. The gear motor comprises a plurality of components. The mounting structure is configured to mount one component to another component of the gear motor. The mounting structure comprises at least one first hole formed in said one component; at least one second hole formed in said another component, the second hole and the first hole being coaxially arranged, the second hole having a diameter being greater or less than that of the first hole; and at least one deformable expansion member engaged in the first hole and the second hole.

Preferably, the deformation of the expansion member in one of the first hole and the second hole is greater than that in the other of the first hole and the second hole.

Preferably, said one component comprises a first ring-shaped end with the first hole defined therein, and said another component comprises a second ring-shaped end with the second hole defined therein, the first ring-shaped end is inserted into the second ring-shaped end, and the diameter of the second hole is less than that of the first hole.

Preferably, said one component comprises a first ring-shaped end with the first hole defined therein, and said another component comprises a second ring-shaped end with the second hole defined therein, the first ring-shaped end is inserted into the second ring-shaped end, and the diameter of the second hole is greater than that of the first hole.

The expansion member is interference fit with one of the first and second holes and interference fit or transition fit with the other of the first and second holes, the expansion member engaging with said one of the first and second holes more firmly than with said the other of the first and second holes.

Preferably, the gearbox comprises a connecting member, the connecting member has a center hole for allowing a motor shaft of the motor to pass there through, the connecting member is mounted to a housing of the motor, said one component is the connecting member, and said another component is an internal ring gear, the expansion member having an interference fit with the connecting member, and having a transition fit with the internal ring gear.

Preferably, the gearbox includes a first internal ring gear and a second internal ring gear, the first internal ring gear and the second internal ring gear overlap in an axial direction of the motor, the first hole is formed in a section of the first internal ring gear that overlaps with the second internal ring gear, and the second hole is formed in a section of the second internal ring gear that overlaps with the first internal ring gear, the second hole having a diameter being greater than that of the first hole.

Preferably, the gearbox includes a first internal ring gear and a second internal ring gear, the first internal ring gear and the second internal ring gear overlap in an axial direction of the motor, the first hole is formed in a section of the first internal ring gear that overlaps with the second internal ring gear, and the second hole is formed in a section of the second internal ring gear that overlaps with the first internal ring gear, the second hole having a diameter being less than that of the first hole.

Preferably, the gearbox comprises a fixing base and an internal ring gear, the fixing base has a center hole for allowing a motor shaft of the motor to pass there through, the internal ring gear and the fixing base overlap in an axial direction of the motor, the first hole is formed in a section of the internal ring gear that overlaps with the fixing base, and the second hole is formed in a section of the fixing base that overlaps with the internal ring gear, the second hole having a diameter being greater than that of the first hole.

Preferably, the gearbox comprises a fixing base and an internal ring gear, the fixing base has a center hole for allowing a motor shaft of the motor to pass there through, the internal ring gear and the fixing base overlap in an axial direction of the motor, the first hole is formed in a section of the fixing base that overlaps with the internal ring gear, and the second hole is formed in a section of the internal ring gear that overlaps with the fixing base, the second hole having a diameter being greater than that of the first hole.

Preferably, the expansion member is coiled spring pin.
Preferably, the expansion member is a C-shaped pin.

In another aspect, a gear motor is provided which includes a motor and a gearbox. The gearbox comprises a mounting structure, a connecting member having a center hole for allowing a motor shaft of the motor to pass therethrough, the connecting member being mounted on an outer housing of the motor; and a first planetary gear train mounted to the connecting member through the mounting structure.

Preferably, the first planetary gear train includes a first sun gear, a first internal ring gear, a first planetary gear set, and a first carrier, the first sun gear is mounted on the motor shaft of the motor, the first internal ring gear is mounted to the connecting member through the mounting structure, the first planetary gear set includes a plurality of planetary gears, the planetary gears are mounted on the first carrier and disposed between the first sun gear and the first internal ring gear so as to be drivingly meshed with the first sun gear and the first internal ring gear, and the first carrier rotates along with the planetary gears.

Preferably, the gearbox further includes a second planetary gear train which comprises a second sun gear, a second internal ring gear, a second planetary gear set, and a second carrier, the second sun gear is mounted on a side of the first carrier opposite from the planetary gears for rotation along with the first carrier, the second internal ring gear is mounted to an end of the first internal ring gear opposite from the connecting member, the second planetary gear set includes a plurality of planetary gears, the planetary gears of the second planetary gear set are mounted on the second carrier and disposed between the second sun gear and the second internal ring gear so as to be drivingly meshed with the second sun gear and the second internal ring gear, wherein the second internal ring gear is mounted to an end of the first internal ring gear opposite from the connecting member through the mounting structure.

Preferably, a shaft connecting portion extends from a side of the second carrier opposite from the planetary gears of the second planetary gear set, for connecting an output shaft of the gear motor and driving the output shaft to rotate, wherein the shaft connecting portion has a center hole for locking one end of the output shaft of the gear motor.

Preferably, the gearbox further includes a fixing base attached around the shaft connecting portion, and the fixing base is mounted to one end of the second internal ring gear opposite from the first internal ring gear through the mounting structure.

Preferably, the gearbox further includes a sleeve attached between the shaft connecting portion and the fixing base, and the sleeve includes a base abutting against both of the second carrier and the fixing base.

Preferably, a stop portion is formed at an end of the shaft connecting portion, and the stop portion cooperates with a stop member to limit movement of the sleeve along an axial direction of the motor.

Preferably, one of the first hole and the second hole is a through hole, and the other of the first hole and the second hole is a blind hole.

In the gear motor in accordance with the preferred embodiment of the present invention, the first and second holes have different diameters and the deformation of the expansion member in one of the first hole and the second hole is greater than that in the other of the first hole and the second hole. The expansion member is interference fit with one of the first and second holes and interference fit or transition fit with the other of the first and second holes, the expansion member engaging with one of the first and second holes more firmly than engaging with the other of the first and second holes. This kind of arrangement can improve the concentricity between the first hole and second hole in assembly the expansion member. Furthermore, this kind of arrangement not only can effectively prevent falling off of the expansion members during assembly and operation of the gear motor, but also can reduce the difficulties in the assembly of the gear motor as well as deformation of the expansion members during the assembly process.

BRIEF DESCRIPTION OF THE DRAWINGS

The present invention is described below in greater detail with reference to the drawings and embodiments.

DETAILED DESCRIPTION OF THE PREFERRED EMBODIMENTS

Figure 1:
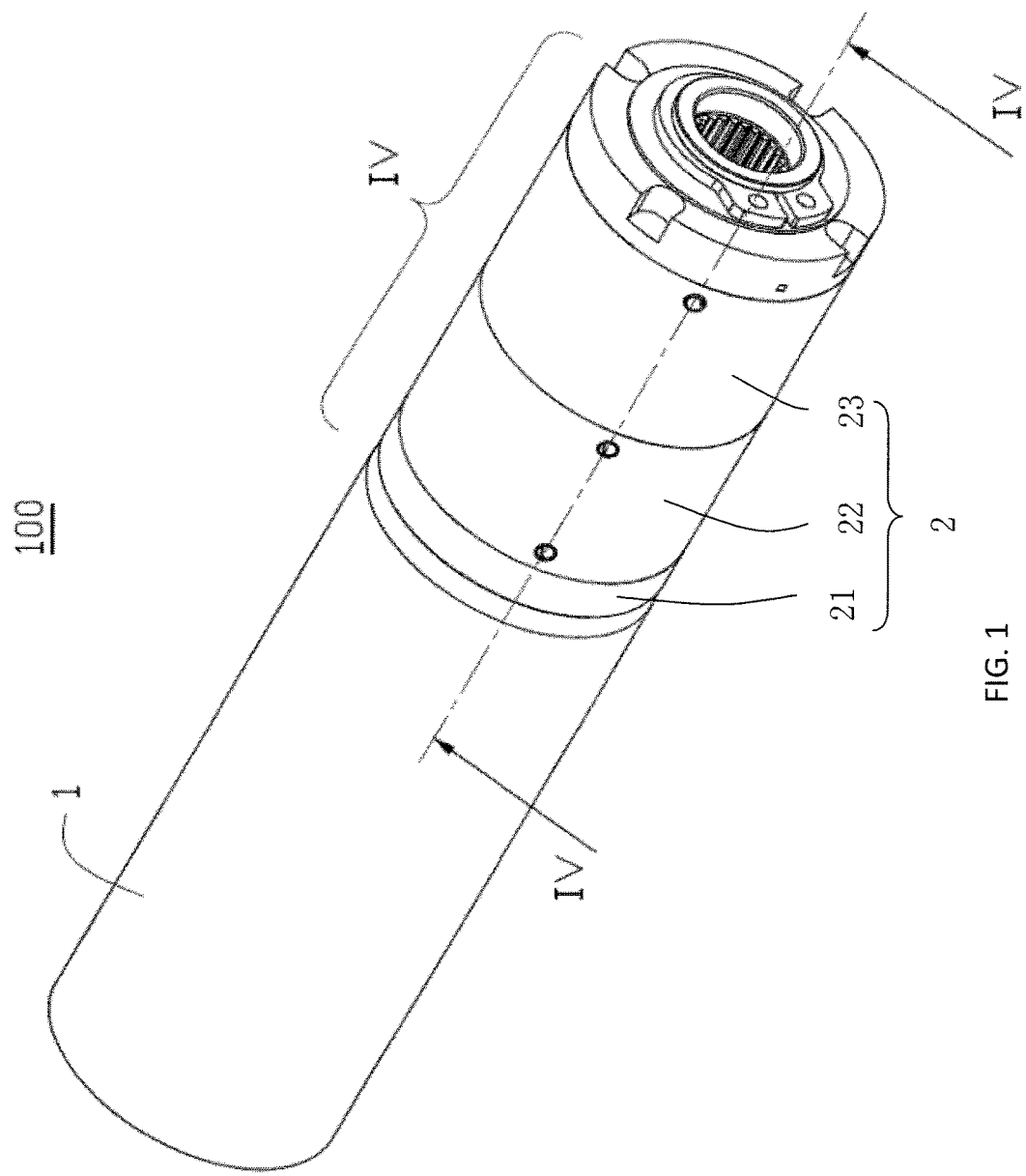
FIG. 1 is a perspective view of a gear motor according to one embodiment of the present invention.
Figure 2:
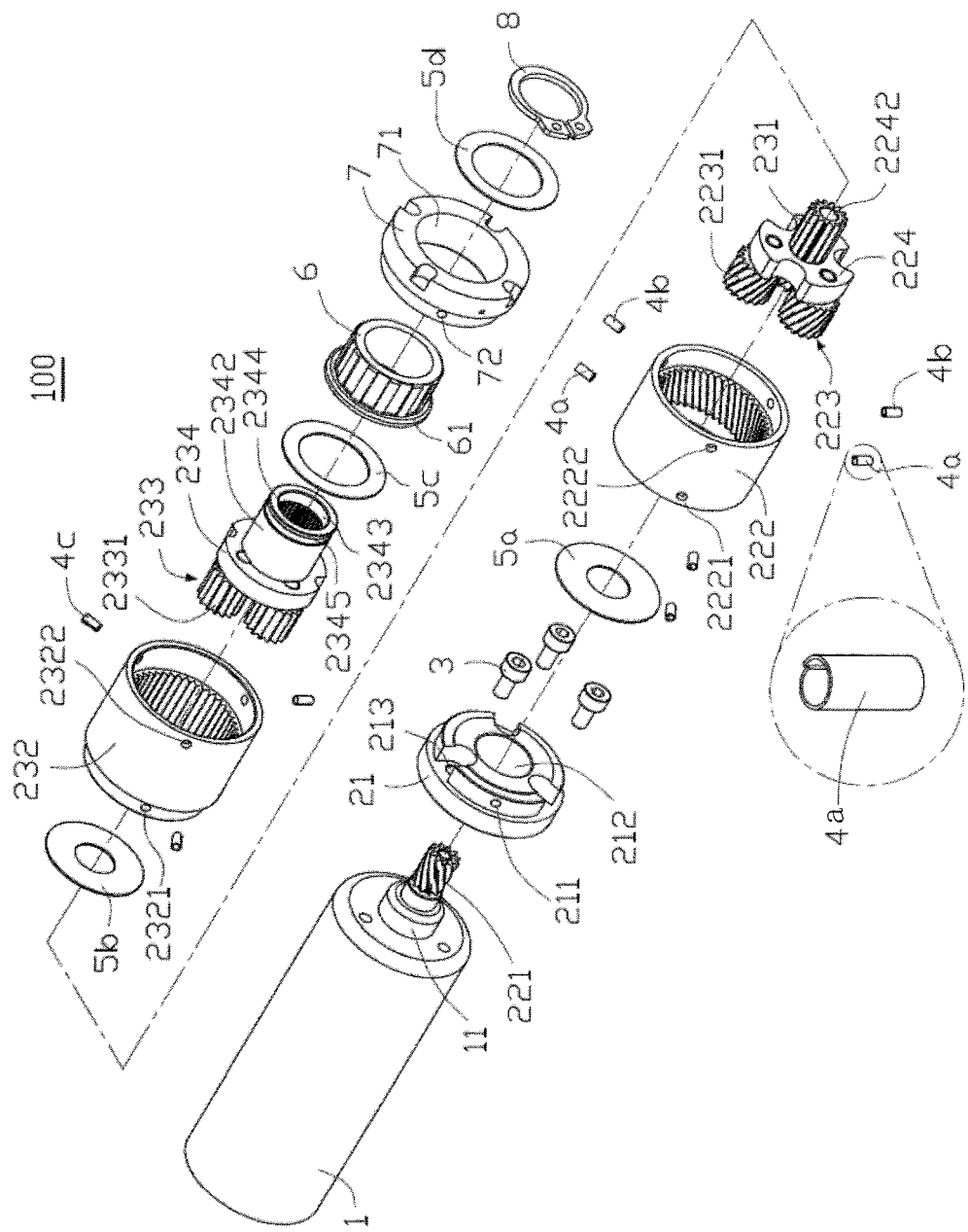
FIG. 2 is an exploded view of a gear motor of FIG. 1.
Figure 3:
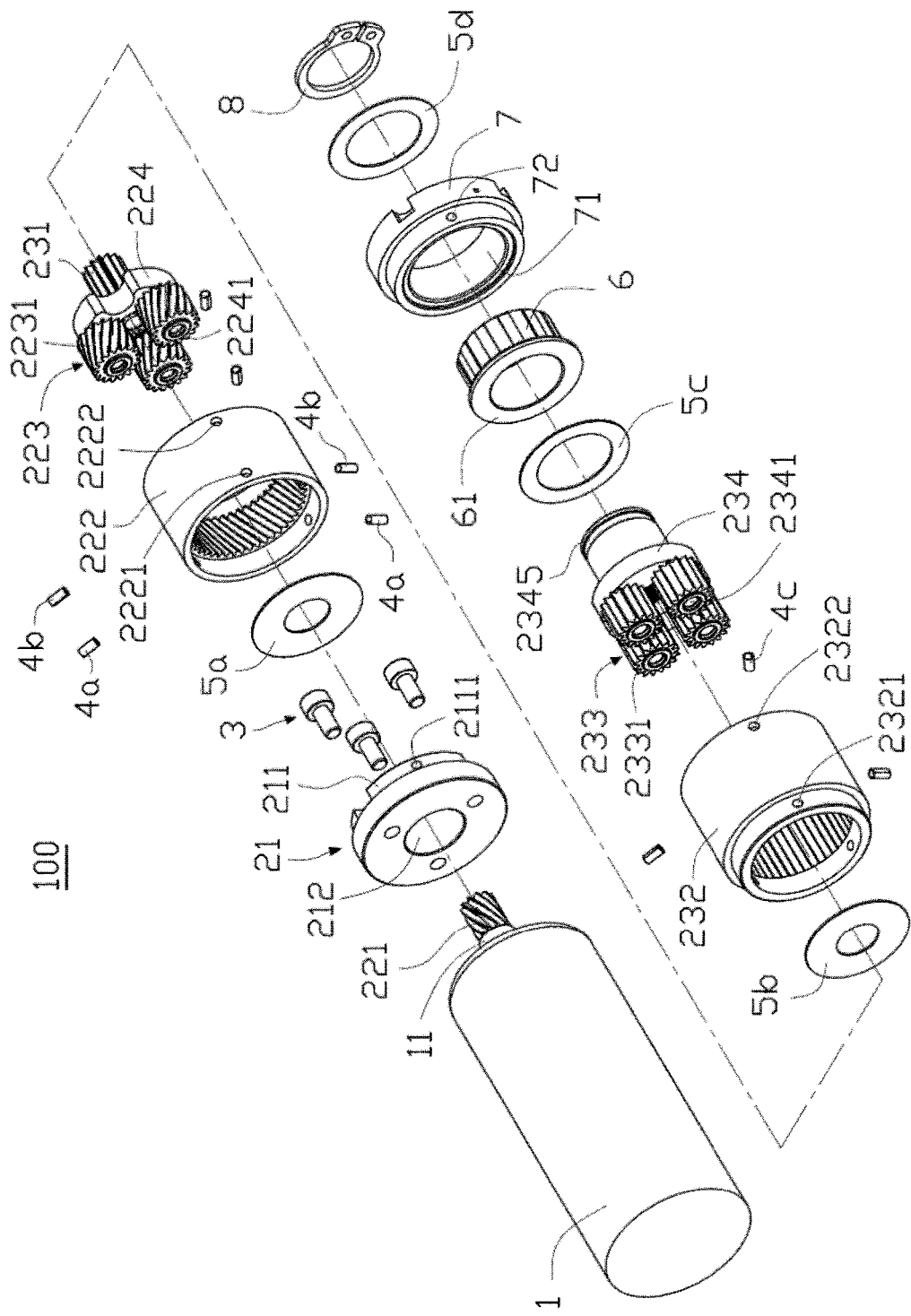
FIG. 3 is an exploded view of the gear motor of FIG. 1, viewed from another aspect.
Figure 4:
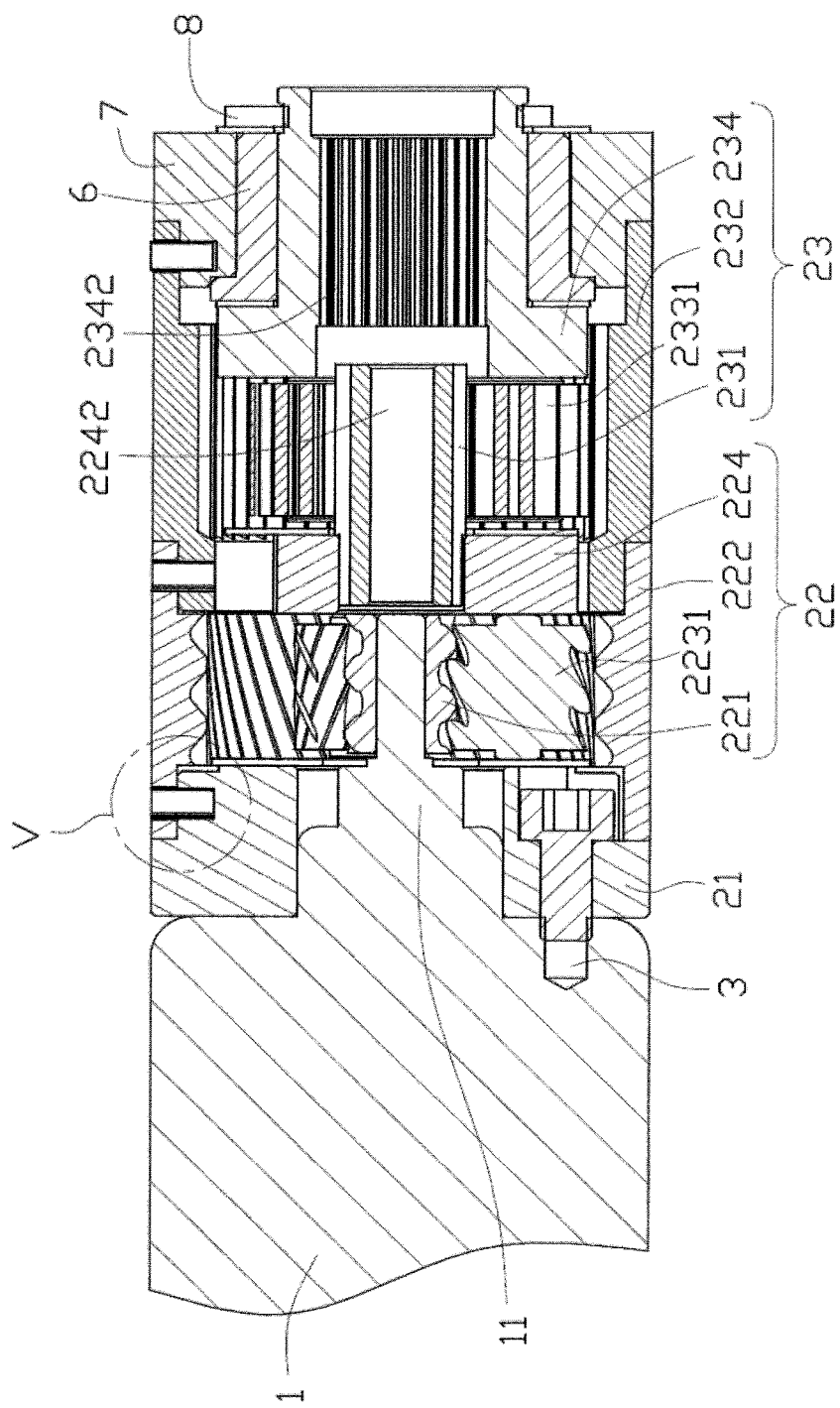
FIG. 4 is a sectional view of the gear motor of FIG. 1, taken along line IV-IV thereof.

Below, embodiments of the present invention will be described in greater detail with reference to the drawings. Elements of similar structures or functions are generally represented by like reference numerals for illustrative purposes throughout the figures. It should be noted that the figures are illustrative rather than limiting. The figures are not drawn to scale, do not illustrate every aspect of the described embodiments, and do not limit the scope of the present disclosure.

It is noted that, when a component is described to be "fixed" or "mounted" or "assembled" to another component, it can be directly located on the another component or there may be an intermediate component. When a component is described to be "connected" to another component, it can be directly connected to the another component or there may be an intermediate component. When a component is described to be "disposed" on another component, it can be directly disposed on the another component or there may be an intermediate component.

Referring to FIG. 1 to FIG. 4, a gear motor 100 in accordance with one embodiment of the present invention includes a motor 1 and a gearbox. In the illustrated embodiment, the gearbox is a planetary reduction gearbox 2. The planetary reduction gearbox 2 includes a connecting member 21 mounted to a shoulder portion of the motor 1 through fastening screws 3 to thereby mount the planetary reduction gearbox 2 to the motor 1. In particular, in the illustrated embodiment, a boss 211 extends from a side of the connecting member 21 opposite from the shoulder portion of the motor 1. A center hole 212 extends through the boss 211 and to the other side of the connecting member 211. The center hole 212 allows a motor shaft 11 of the motor 1 to pass therethrough. A plurality of through holes 213 is arranged surrounding the center hole 212. The through holes 213 are aligned with multiple holes in the shoulder portion of the motor 1, for allowing the screws to pass therethrough and to be connected to the shoulder portion of the motor 1. In alternative embodiments, the connecting member 21 may not include the boss.

The planetary reduction gearbox 2 further includes a first planetary gear train 22 and a second planetary gear train 23. The first planetary gear train 22 includes a first sun gear 221, a first internal ring gear 222, a first planetary set 223, and a first carrier 224. The first sun gear 221 is mounted on the motor shaft 11, protrudes out of the connecting member 21, and rotates along with the motor shaft 11. The first internal ring gear 222 is connected to the connecting member 21, and cooperates with the connecting member 21 to form a component of an outer housing of the gear motor 100 in the illustrated embodiment. In particular, in the illustrated embodiment, one end of a housing of the first internal ring gear 222 overlaps axially with the boss 211 of the connecting member 21, both the housing of the first internal ring gear 222 and the boss 211 define a plurality of holes arranged circumferentially and aligned with each other radially, and expansion members 4a pass through the holes to mount the first internal ring gear 222 to the connecting member 21. More specifically, in the illustrated embodiment, one end of the internal ring gear 222 is attached around the boss 211 of the connecting member 21; a plurality of through holes 2221 is defined along an outer circumference of the end of the first internal ring gear 222; a plurality of holes 2111 is defined along an outer circumference of the boss 211, corresponding to the through holes 2221; the expansion members 4a extend through the through holes 2221 and into the holes 2111 of the boss 211, and have an interference fit with the through holes 2221 or the holes 2111. In an alternative embodiment, one end of the connecting member 21 is disposed at one end of the first internal ring gear 222, corresponding holes are formed at the end of the connecting member 21 and the end of the first internal ring gear 222, and the expansion members 4a are inserted into the corresponding holes to fix the connecting member 21 to the first internal ring gear 222. In still another embodiment, a plurality of corresponding lugs protrudes from one end of the connecting member 21 and one end of the first internal ring gear 222, holes are formed in the lugs, and the expansion members 4a are inserted into the corresponding holes to fix the connecting member 21 to the first internal ring gear 222. In the illustrated embodiment, the expansion members 4a are spring pins and, more specifically, coiled pins. In an alternative embodiment, the expansion members 4a may also be C-shaped pins rolled from steel plates. Thus, the expansion members 4a are deformable.

The first planetary gear set 223 is mounted on the first carrier 224 and includes a plurality of planetary gears 2231. In the illustrated embodiment, a plurality of axles 2241 extends from a side of the first carrier 224 facing the motor 1 in a direction parallel to an axial direction of the motor 1. The planetary gears 2231 are mounted around the axles 2241, respectively. The planetary gears 2231 are received between the first sun gear 221 and the first internal ring gear 222, and are each meshed with teeth of the first sun gear 221 and the first internal ring gear 222. The first planetary gear train 22 is designed to provide helical cylindrical gear transmission, i.e. each of the first sun gear 221, the first internal ring gear 222, and the planetary gears 2231 is a helical gear. The teeth are gradually engaged and disengaged in the helical gear transmission, which enables a smooth and stable transmission of the first planetary gear train 22 and reduces the noise generated by the first planetary gear train 22 during operation. In addition, a spring gasket 5a is disposed between end faces of the connecting member 21 and the planetary gears 2231, which can reduce the friction between the planetary gears 2231 and the connecting member 21 and hence further reduce the noise generated by the first planetary gear train 22 during operation.

The second planetary gear train 23 includes a second sun gear 231, a second internal ring gear 232, a second planetary set 233, and a second carrier 234. The second sun gear 231 is mounted on a side of the first carrier 224 opposite from the planetary gears 2231. In particular, an axle 2242 extends from the side of the first carrier 224 opposite from the planetary gears 2231. The second sun gear 231 is mounted on the axle 2242 for rotation with the first carrier 224. The second internal ring gear 232 is mounted to the first internal ring gear 222, and forms a part of the outer housing of the gear motor 100 in the illustrated embodiment. In particular, in the illustrated embodiment, one end of a housing of the second internal ring gear 232 overlaps axially with another end of the first internal ring gear 222 opposite from the connecting member 21, both ends of the second internal ring gear 232 and first internal ring gear 222 define a plurality of holes arranged circumferentially and aligned with each other radially, and expansion members 4b pass through the holes to mount the second internal ring gear 232 to the first internal ring gear 222. More specifically, in the illustrated embodiment, one end of the first internal ring gear 222 is attached around one end of the second internal ring gear 232; a plurality of through holes 2222 is defined along an outer circumference of the end of the first internal ring gear 222; a plurality of holes 2321 is defined along an outer circumference of the end of the second internal ring gear 232, corresponding to the through holes 2222; the expansion members 4b extend through the through holes 2222 and into the holes 2321, and have an interference fit with the through holes 2222 or the holes 2321. In an alternative embodiment, one end of the second internal ring gear 232 may be attached around the end of the first internal ring gear 222 opposite from the connecting member 21, and the expansion members are inserted into the corresponding holes to fix the first internal ring gear 222 to the second internal ring gear 232. In still another embodiment, a plurality of corresponding lugs protrudes from one end of the second internal ring gear 232 and one end of the first internal ring gear 222 opposite from the connecting member 21, holes are formed in the lugs, and the expansion members 4b are inserted into the corresponding holes to fix the first internal ring gear 222 to the second internal ring gear 232.

The second planetary gear set 233 is mounted on the second carrier 234 and includes a plurality of planetary gears 2331. In the illustrated embodiment, a plurality of axles 2341 extends from a side of the second carrier 234 facing the motor 1 in a direction parallel to an axial direction of the motor 1. The planetary gears 2331 are mounted around the axles 2341, respectively. The planetary gears 2331 are received between the second sun gear 231 and the second internal ring gear 232, and are each meshed with teeth of the second sun gear 231 and the second internal ring gear 232. The second planetary gear train 23 is designed to provide spur cylinderical gear transmission. In addition, a spring gasket 5b is disposed between end faces of the first carrier 224 and the planetary gears 2331, which can reduce the friction between the planetary gears 2331 and the first carrier 224 and hence reduce the noise generated by the second planetary gear train during operation.

A shaft connecting portion 2342 extends from a side of the second carrier 234 opposite from the planetary gears 2331, for connecting with an output shaft (not shown) of the gear motor 100. In the illustrated embodiment, the shaft connecting portion 2342 is a tubular structure having a center hole 2343. An internal ring gear 2344 is formed in the center hole 2343. One end of the output shaft of the gear motor 100 is meshed with the internal ring gear 2344 so as to rotate along with the second carrier 234. A sleeve 6 is attached around the shaft connecting portion 2342, and a spring gasket 5c is disposed between a base 61 of the sleeve 6 and the second carrier 234. A fixing base 7 is further attached around the sleeve 6. The fixing base 7 has a center hole 71 for allowing the output shaft of the gear motor 100 to pass therethrough. The fixing base 7 is mounted on the second internal ring gear 232 and forms a part of the housing of the gear motor 100 in the illustrated embodiment. In particular, in the illustrated embodiment, one end of the fixing base 7 overlaps axially with one end of the second internal ring gear 232 opposite from the first internal ring gear 222, both ends of the fixing base 7 and the second internal ring gear 232 define a plurality of holes arranged circumferentially and aligned with each other, and expansion members 4c pass through the holes to mount the fixing base 7 to the second internal ring gear 232. More specifically, in the illustrated embodiment, one end of the fixing base 7 is inserted into the second internal ring gear 232 and abuts against the base 61 of the sleeve 6; a plurality of holes 72 is defined along an outer circumference of the end of the fixing base 7; a plurality of through holes 2322 is defined along an outer circumference of the end of the second internal ring gear 232, corresponding to the holes 72; the expansion members 4c extend through the through holes 2322 and into the holes 72, and have an interference fit with the through holes 2322 or the holes 72. In an alternative embodiment, one end of the second internal ring gear 232 may be inserted into the fixing base 7, the fixing base 7 forms therein a step abutting against the base 61 of the sleeve 6, and the expansion members 4c are inserted into the corresponding holes to fix the fixing base 7 to the second internal ring gear 232. In still another embodiment, a plurality of corresponding lugs protrudes from one end of fixing base 7 and one end of the second internal ring gear 232 opposite from the first internal ring gear 222, holes are formed in the lugs, and the expansion members 4c are inserted into the corresponding holes to fix the fixing base 7 to the second internal ring gear 232. In the illustrated embodiment, a stop portion 2345 is formed along an outer circumference of a distal end of the shaft connecting portion 2342. The stop portion 2345 cooperates with a stop member 8 to limit movement of the sleeve 6 along an axial direction of the gear motor 100. A spring gasket 5d is further disposed between the stop member 8 and the sleeve 6.

While the gearbox is illustrated above as including two stages of speed reduction mechanism, i.e. the first planetary gear train 22 and the second planetary gear train 23, it should be understood that the gearbox of embodiments of the present invention may also include more or less stages of speed change mechanism. For example, in the event of a single stage of speed change mechanism, the shaft connecting portion may extend from the side of the first carrier 224 opposite from the motor 1, for connecting with the output shaft of the gear motor 10. In the event of three stages of speed change mechanism, an axle may extend from the side of the second carrier 234 opposite from the motor 1, for mounting gears or other parts of a third stage of speed change mechanism.

Figure 5:
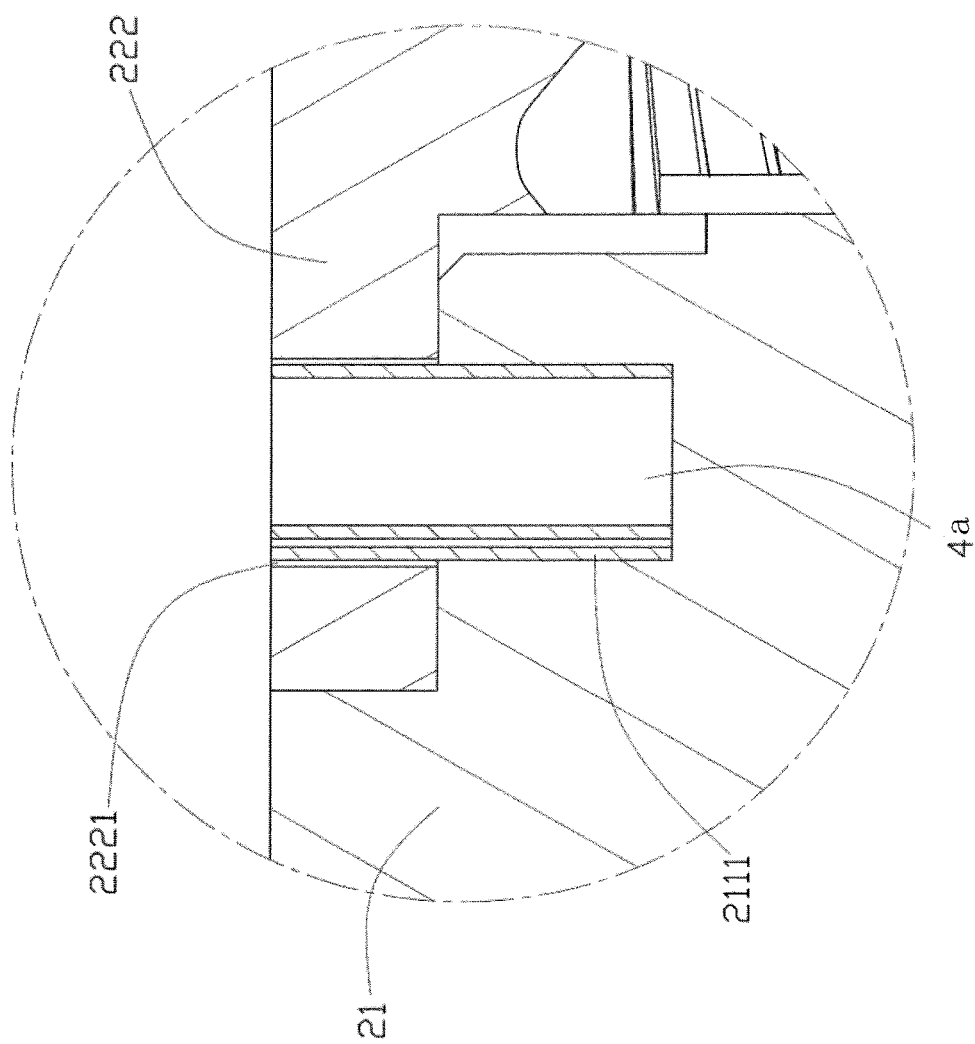
FIG. 5 is an enlarged view of a mounting structure of the gear motor of FIG. 4.
Figure 6:
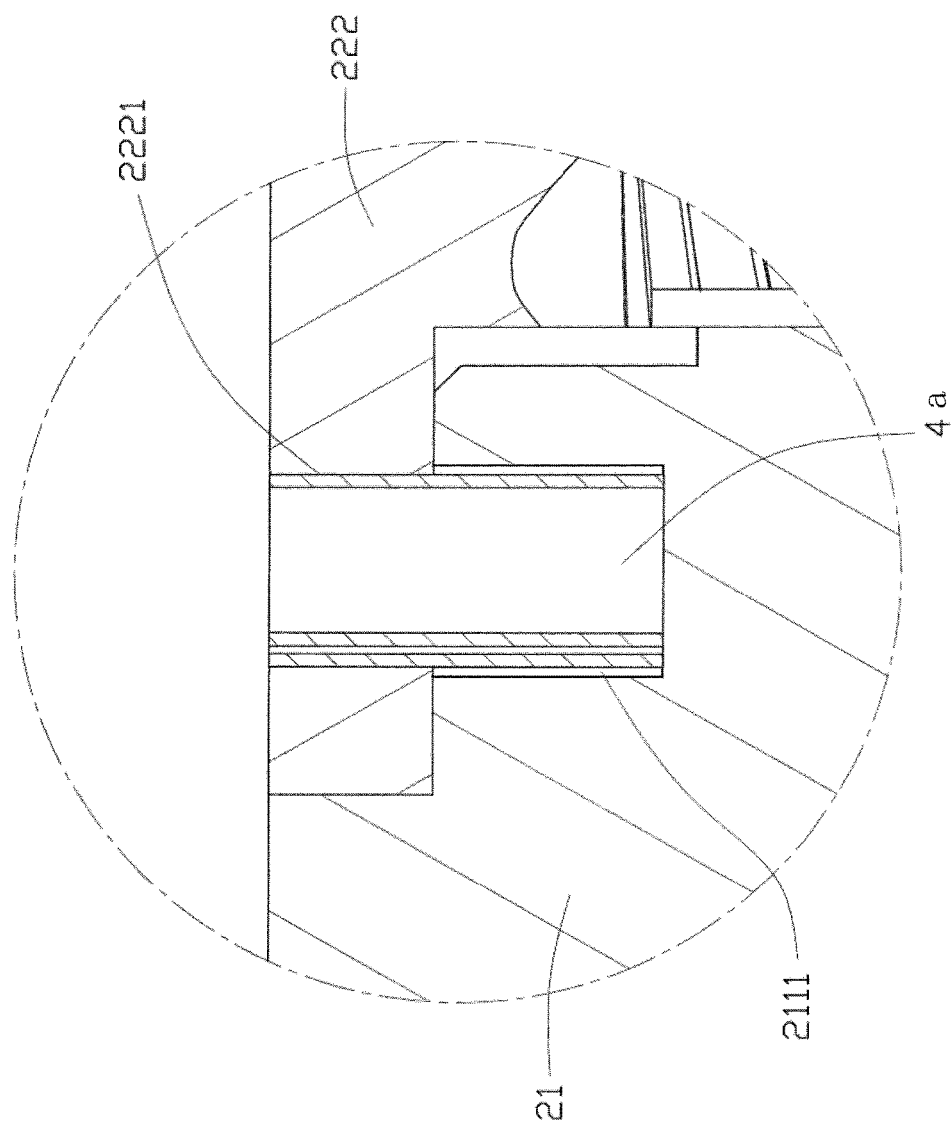
FIG. 6 is an enlarged view of a mounting structure of the gear motor of FIG. 4 according to another embodiment.

FIG. 5 is an enlarged view of a mounting structure used between the first internal ring gear 222 and the connecting member 21. The through holes 2221 are defined along the circumference of the end of the first internal ring gear 222. The holes 2111 are defined along the outer circumference of the boss 211 of the connecting member 21, corresponding to the through holes 2221. The holes 2111 may be through holes or blind holes and, in the illustrated embodiment, are blind holes. The through holes 2221 and the holes 2111 are coaxially arranged, and the through holes 2221 are greater than the holes 2111 in diameter. The expansion members 4a have an interference fit with the holes 2111, and have a transition fit with the through holes 2221. Referring to FIG. 6, in another embodiment, the holes 2111 are greater than the through holes 2221 in diameter, and the expansion members 4a have an interference fit with the through holes 2221 and have a transition fit with the holes 2111. In fitting the expansion members 4a into the above holes, the expansion members 42 are deformed and the deformation of the expansion member in one of the holes 2111, 2221 is greater than that in the other of the holes 2111, 2221. One type of holes is designed to have a firmly interference fit with the expansion members 4a, while the other type of holes is designed to have a slightly interference fit or transition fit with the expansion members 4a. This kind of arrangement can improve the concentricity of the holes 2111, 2221. Furthermore, this kind of arrangement not only can effectively prevent falling off of the expansion members 4a during assembly and operation of the gear motor 100, but also can reduce the difficulties in the assembly of the gear motor 100 as well as deformation of the expansion members 4a during the assembly process.

The holes 2111, 2321, 72 may be called as first holes while the holes 2221, 2222, 2322 may be called as second holes. Alternatively, the holes 2111, 2321, 72 may be called as second holes while the holes 2221, 2222, 2322 may be called as first holes.

While only the mounting structure between the first internal ring gear 222 and the connecting member 21 is described above in detail, it should be understood that same or similar mounting structures can be used between the first internal ring gear 222 and the second internal ring gear 232, and between the second internal ring gear 232 and the fixing base 7. It should also be understood that a different and non-similar mounting structure can be used, and the present invention is not intended to limit the mounting structure to any particular form.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A mounting structure for use in a gear motor comprising a motor and a gearbox connected to the motor, the mounting structure configured to mount one component of the gearbox to another component of the gear motor, wherein the mounting structure comprises:
   at least one first hole formed in said one component;
   at least one second hole formed in said another component, the second hole and the first hole being coaxially arranged, the second hole having a diameter being greater or less than that of the first hole; and
   at least one deformable expansion member engaged in the first hole and the second hole,
   wherein the deformation of the expansion member in one of the first hole and the second hole is greater than that in the other of the first hole and the second hole, and
   wherein the expansion member is interference fit with both of the first and second holes, the expansion member engaging with said one of the first and second holes more firmly than with said the other of the first and second holes.

2. The mounting structure of claim 1, wherein said one component comprises a first ring-shaped end with the first hole defined therein, and said another component comprises a second ring-shaped end with the second hole defined therein, the first ring-shaped end is inserted into the second ring-shaped end, and the diameter of the second hole is less or greater than that of the first hole.

3. The mounting structure of claim 1, wherein said one component and said another component are respectively a connecting member and a first internal ring gear of the gearbox, and connected to each other through the mounting structure, the connecting member has a center hole for allowing a motor shaft of the motor to pass therethrough, the connecting member is mounted to a housing of the motor.

4. The mounting structure of claim 1, wherein said one component and said another component are respectively a first internal ring gear and a second internal ring gear of the gearbox, the first internal ring gear and the second internal ring gear overlap in an axial direction of the motor, the first hole is formed in a section of the first internal ring gear that overlaps with the second internal ring gear, and the second hole is formed in a section of the second internal ring gear that overlaps with the first internal ring gear, the diameter of the second hole is greater than that of the first hole.

5. The mounting structure of claim 1, wherein said one component and said another component are respectively a first internal ring gear and a second internal ring gear of the gearbox, the first internal ring gear and the second internal ring gear overlap in an axial direction of the motor, the first hole is formed in a section of the first internal ring gear that overlaps with the second internal ring gear, and the second hole is formed in a section of the second internal ring gear that overlaps with the first internal ring gear, the diameter of the second hole is less than that of the first hole.

6. The mounting structure of claim 1, wherein said one component and said another component are respectively an internal ring gear and a fixing base of the gearbox, the fixing base has a center hole for allowing a motor shaft of the motor to pass therethrough, the internal ring gear and the fixing base overlap in an axial direction of the motor, the first hole is formed in a section of the internal ring gear that overlaps with the fixing base, and the second hole is formed in a section of the fixing base that overlaps with the internal ring gear, the diameter of the second hole is greater than that of the first hole.

7. The mounting structure of claim 1, wherein said one component and said another component are respectively a fixing base and an internal ring gear of the gearbox, the fixing base has a center hole for allowing a motor shaft of the motor to pass therethrough, the internal ring gear and the fixing base overlap in an axial direction of the motor, the first hole is formed in a section of the fixing base that overlaps with the internal ring gear, and the second hole is formed in a section of the internal ring gear that overlaps with the fixing base, the diameter of the second hole is greater than that of the first hole.

8. The mounting structure of claim 1, wherein the expansion member is a coiled spring pin.

9. The mounting structure of claim 1, wherein the expansion member is a C-shaped pin.

10. A gear motor comprising a motor and a gearbox, wherein the gearbox comprises:
   at least one mounting structure comprising
      at least one first hole,
      at least one second hole, the second hole and the first hole being coaxially arranged, the second hole having a diameter being greater or less than that of the first hole, and
      at least one deformable expansion member engaged in the first hole and the second hole,
      wherein the deformation of the expansion member in one of the first hole and the second hole is greater than that in the other of the first hole and the second hole,
      wherein the expansion member is interference fit with both of the first and second holes, the expansion member engaging with said one of the first and second holes more firmly than with said the other of the first and second holes;
   a connecting member having a center hole for allowing a motor shaft of the motor to pass therethrough, the connecting member being mounted to an outer housing of the motor; and
   a first planetary gear train mounted to the connecting member.

11. The gear motor of claim 10, wherein the first planetary gear train includes a first sun gear, a first internal ring gear, a first planetary gear set, and a first carrier, the first sun gear is mounted on the motor shaft of the motor, said at least one mounting structure comprises a first mounting structure, said at least one first hole of the first mounting structure is defined in the first internal ring gear, said at least one second hole of the first mounting structure is defined in the connecting member, the first internal ring gear is mounted to the connecting member through the first mounting structure, the first planetary gear set includes a plurality of planetary gears, the planetary gears are mounted on the first carrier and disposed between the first sun gear and the first internal ring gear so as to be drivingly meshed with the first sun gear and the first internal ring gear, and the first carrier rotates along with the planetary gears.

12. The gear motor of claim 11, wherein the gearbox further includes a second planetary gear train which comprises a second sun gear, a second internal ring gear, a second planetary gear set, and a second carrier, the second sun gear is mounted on a side of the first carrier opposite from the planetary gears for rotation along with the first carrier, the second internal ring gear is mounted to an end of the first internal ring gear opposite from the connecting member, the second planetary gear set includes a plurality of planetary gears, the planetary gears of the second planetary gear set are mounted on the second carrier and disposed between the second sun gear and the second internal ring gear so as to be drivingly meshed with the second sun gear and the second internal ring gear, wherein said gear motor further comprises a second mounting structure, a first hole of the second mounting structure is defined in the second internal ring gear, a second hole of the second mounting structure is defined in an end of the first internal ring gear opposite to the connecting member, the second internal ring gear is mounted to the end of the first internal ring gear through the second mounting structure.

13. The gear motor of claim 12, wherein a shaft connecting portion extends from a side of the second carrier opposite from the planetary gears of the second planetary gear set.

14. The gear motor of claim 13, wherein the gearbox further includes a fixing base attached around the shaft connecting portion, and said gear motor further comprises a third mounting structure, a first hole of the third mounting structure is defined in the fixing base, a second hole of the third mounting structure is defined in one end of the second internal ring gear opposite to the first internal ring gear, the fixing base is mounted to the end of the second internal ring gear through the third mounting structure.

15. The gear motor of claim 14, wherein the gearbox further includes a sleeve attached between the shaft connecting portion and the fixing base, and the sleeve includes a base abutting against both of the second carrier and the fixing base.

16. The gear motor of claim 15, wherein a stop portion is formed at an end of the shaft connecting portion, and the stop portion cooperates with a stop member to limit movement of the sleeve along an axial direction of the motor.

17. The gear motor of claim 10, wherein one of the first hole and the second hole is a through hole, and the other of the first hole and the second hole is a blind hole.

* * * * *